Patented Jan. 19, 1937

2,067,910

UNITED STATES PATENT OFFICE 2,067,910

COATING COMPOSITION AND METHOD FOR PRODUCTION THEREOF

John Fletcher, Kenmore, N. Y., assignor to Plastergon Wall Board Company, Buffalo, N. Y., a corporation of New York No Drawing. Application July 26, 1935, Serial No. 33,239

11 Claims. (Cl. 134—26)

This invention relates to coating compounds and particularly to those utilizing a synthetic resin as one of the ingredients thereof, and is a continuation in part of my prior copending application Ser. No. 707,547 filed Jan. 20, 1934 for coating compounds etc.

Various synthetic resins and natural resins have been known and used as the base of various varnishes and paints, by making a solution of such resins in alcohol or other similar low boiling solvents. Phenol-aldehyde condensation resins, dissolved in alcohol, have been used as a varnish or paint and while such a varnish or paint is water resistant, it does not adhere to metals, nor will other paints and varnishes adhere to it. Certain natural resins and also synthetic resins have also been used in solutions in the manufacture of varnishes and coating and impregnating preparations, because they have the property of adhering to metal, but they are not water resistant and are open to other objections.

I have discovered that a very satisfactory composition for coating various objects may be prepared, which utilizes the advantages of the phenol-aldehyde condensation resins, and of the natural and other synthetic resins which adhere to metal, while at the same time avoiding the disadvantages of both.

In the manufacture of this improved composition I condense a thermo-setting phenol-aldehyde resin and arrest the condensation when the resin reaches the gel stage such as of a heavy stiff paste when cooled to room temperatures. The consistency is by preference at least that of fresh putty, but the condensation should be arrested before the resin reaches the insoluble and infusible stage. I have found that arresting the condensation when a sample taken from the kettle and immediately chilled to approximately room temperatures, has the general appearance and consistency of caramel taffy, gives very satisfactory results. The resin is then separated from the water of condensation and dissolved in a solvent containing a phenol, and the proportions of the phenol used in the solvent should be greater than 5% of the quantity of the resin to be dissolved and preferably at least 10% of the quantity of such resin. To this solution of the thermosetting resin I add another resin having the property of adherence to metal, and among those other resins which I have found to be particularly satisfactory for this purpose may be mentioned the polybasic acid-polyhydric alcohol-fatty acid type of which the phthalic type resins are a sample, the natural resins of which all, with the exception of rosin, may be used, and the gasoline-insoluble portion of oxidized abietic acid which is known in the trade under the name "Vinsol resin No. 1".

Among the natural resins I have found the kauri gum resins to be very satisfactory.

The "Vinsol resin No. 1", above referred to, is a hard black resin derived from Southern long leaf pine wood and is the gasoline-insoluble portion of oxidized wood rosin (oxidized abietic acid) which is produced as a residue by the steam distilled process of naval stores manufacture, as applied to wood turpentine. This "Vinsol" resin is believed to consist chiefly of highly oxidized and highly polymerized abietic acid and resin acids along with smaller amounts of polyphenols, ligneous materials and unoxidized abietic acid. This resin has a melting point (drop method) of 105° to 115° C., a specific gravity of approximately 1.2 and is soluble in and miscible with acetone, ethyl, methyl, and butyl alcohols, ethyl, butyl, amyl and pent acetates, chloroform, castor oil, strong caustic solutions, and lacquer solvents, but is practically insoluble in and immiscible with petroleum oils, turpentine, tetrachlorethylene, carbon tetrachloride, linseed oils, soya bean oil, rape seed oil, corn oil, cotton seed oil, fish oil, and raw tung oil.

As a specific example, heat 100 parts of cresol with 75 parts of a 40% solution of formaldehyde and 0.25 parts of sodium hydroxide (NaOH) to boiling. Continue the heating until separation occurs, water appears on the surface, and a resin is condensed and assumes a yellow brown cloudy appearance. The heating should be continued at the boiling temperature until the condensed mass or resin separates and settles, and particularly until a sample taken from the kettle and immediately chilled to approximately room temperatures has a gel consistency such as a heavy paste consistency, and preferably at least as heavy as fresh putty, but the heating should not be continued until the condensed resin assumes a solid insoluble and infusible condition. I have found that excellent results are obtained when the sample referred to has the general appearance and consistency of caramel taffy.

When the condensed resin reaches the desired consistency, the condensed resin is allowed to cool and separate from the water of condensation. The water is then removed, such as by decantation, and the resin is dried free from residual moisture. To this resin I add an amount of cresol or other phenol which may vary, preferably from 10% to equal amounts of condensed resin and cresol, and this mixture is reheated with agitation until the resin redissolves in the cresol. Some alcohol or other solvent for the resin may also be used as a part of the solution in which the resin is redissolved. To this solution I also add a quantity, preferably over 10% by weight of such resin, of another resin which has the property of adherence to metal, such as one or more of those above mentioned, and this additional resin may be added while in a solid condition or by incorporating it in a separate solution which is then blended or mixed with the solution of the phenol-aldehyde resin in cresol. This mixture of resins in a solvent produces a complete solution and the resins do not separate.

As an example of a resin made from a polybasic acid-polyhydric alcohol and a fatty acid, reference may be had to U. S. patent to Kienle No. 1,893,873. Such a resin has the property of adherence to metal and when added to the phenol-aldehyde condensation resin, functions somewhat in the manner of a plasticizer for the phenolic condensation resin, and serves to improve its flexibility when the phenolic resin is advanced to the insoluble and infusible state, such as by the heating of an article coated with this improved blend of resins to a temperature sufficient to drive off the phenol solvent, or above approximately 250° F. The resin which is added to the phenol-aldehyde condensation resin apparently inter-reacts with that condensation resin when heat is applied to the drying film, and produces a film that, when hardened, offers an exceptionally high resistance to destruction, particularly from contact with acids, oils, acetone and ketones.

The cresol acts as an inhibitor for the thermo-setting phenol-aldehyde resin, to retard or prevent the advancement of that resin into the infusible and insoluble stage, and apparently retains in solution the component parts of the blend or mixture until a temperature above approximately 250° F. is reached. This action of the cresol allows for a free flow of the drying film and retards the film advancement of the resin until the cresol is driven off at the high temperature, and then the advancement of the resin into the insoluble and infusible stage occurs rapidly and produces an exceptionally hard and resistant film.

It will be understood that cresol is merely one of a group of materials known under the generic name of phenols, and therefore by the term "phenol", as used throughout this specification and claims, I refer not only to the compound "phenol" but also to its homologues which are all commonly known in the art under the generic name "phenol". The cresol and formaldehyde are at the present time the preferred materials used for forming the thermo-setting resin of the advancing type, because these ingredients are readily available and are of low cost.

It will be understood however that other aldehydes, such as paraldehyde for example, may also be employed as an equivalent for formaldehyde. It will also be understood that in the formation of the polybasic acid-polyhydric alcohol-fatty acid type of resin, the fatty acid may be that of a drying oil or a non-drying oil, but the drying oil acids at the present time appear to give the best results. Blown castor oil may also be employed in place of the drying oil acids.

In making a solution of the phenol-aldehyde resin, a considerable amount of alcohol such as ethyl alcohol or other low boiling solvent may also be employed with the phenol, so that a coating of the varnish will readily air-dry, enabling the coated article to be handled easily. The phenol or other high boiling solvent is eliminated from the coating, even though air-dried, either by absorption by the material coated, or long exposure to air, or by baking to a temperature at or above the boiling point of the high boiling solvent. A fully hardened film made in accordance with this invention, I have found, is highly resistant to acetone, alcohols and oils, as well as all acids including concentrated sulphuric, hydrochloric and hydrofluoric, except phosphoric acid. Such a coating is also quite resistant to alkalies, although not to the same extent as to acids, and is unaffected by high temperatures. Among the high boiling solvents which may be used in place of the phenols, may be mentioned xylol, the derivatives of phenol such as cyclohexanone, methyl cyclohexanone and cyclohexanol, and benzyl alcohol, but the phenols are the most satisfactory and least expensive.

A varnish made in accordance with this invention is non-skinning, by which I mean that it will not form a skin when exposed to air in a partially filled can and, when combined with white lead, it does not thicken upon standing. Such a varnish when applied as a coating and hardened, is unaffected by weather conditions, and may be used under water. Because of its resistance to alkali, it makes an excellent coating for concrete either when exposed to air or water. Nitrocellulose may also be blended with this improved composition, and the mixture with the nitrocellulose dries very rapidly in air, dust free, so that the article can be handled very easily and soon after coating in order to place it in an oven for heating to advance the coating to the insoluble stage.

A varnish made from this improved composition will adhere to metals and particularly to new, untreated, galvanized iron and aluminum, and it may also be employed to advantage in impregnating or coating fibrous materials such as wall board, gypsum board, open pore insulating board, as a priming coat for other paints and varnishes, and also for the treatment of rubber or any fibrous material in order to prevent penetration of an article and destruction of the fiber thereof by termites, and also to prevent surface destruction of an article through fungus growth.

It will be understood that various changes in the details, proportions and other materials which have been herein described by way of example in order to explain the nature of the invention and the principle thereof, may be made by those skilled in the art within the principle and scope of the invention, as expressed in the appended claims.

I claim:

1. The method of making an improved coating composition which comprises heating together as the principal reaction agents approximately 100 parts of a phenol, 75 parts of a 40% solution of formaldehyde, 0.25 parts of sodium hydroxide until separation occurs, water appears on the surface, and a condensation resin forms and assumes a yellow brown cloudy appearance, continuing the heating at the boiling temperature until a sample of the condensation resin from said agents taken from the kettle and immediately chilled has a heavy paste appearance that is harder approximately than fresh putty and the general appearance of caramel taffy, then separating the water of condensation from the resin, redissolving the resin in a solvent containing a relatively low boiling solvent and a phenol in which the phenol equals at least approximately 10% of the quantity of condensed resin, and blending with the resin solution another and separate resin selected from the group consisting of polybasic acid-polyhydric alcohol esters, natural gum resins, and the gasoline-insoluble portion of oxidized abietic acid.

2. An improved varnish composition capable of forming a smooth finish on baking and comprising a solution having dissolved therein a separately formed thermo-setting, phenol-formaldehyde resin which has been condensed with the phenol and formaldehyde as the principal reaction agents in approximately molecular proportions and with the condensation of said agents arrested after the resin reaches approximately the consistency of fresh putty and before it reaches the hard, infusible and insoluble stage, the other of said resins being selected from the group consisting of polybasic acid-polyhydric alcohol esters, natural gum resins and the gasoline insoluble portion of oxidized abietic acid, said solution containing a relatively low boiling solvent and also a phenol, with the phenol of the solvent present in a quantity equalling more than approximately 5% of the quantity of thermo-setting resin in the solution.

3. A process of preparing an improved liquid coating composition capable of forming a smooth finish on baking which comprises producing a thermo-setting condensation resin from a phenol and formaldehyde as the principal reaction agents, arresting the condensation after the condensed resin reaches at least a consistency approximating, when a sample is cooled to room temperatures, that of fresh putty and before it becomes insoluble and infusible, separating the resin from the water of condensation, dissolving the separated resin in a solution containing a phenol, with the phenol content greater than 5% of the quantity of resin to be dissolved, and blending with the solution a resin selected from the group consisting of polybasic acid-polyhydric alcohol esters, natural gum resins, and the gasoline insoluble portion of oxidized abietic acid.

4. The method of making an improved coating composition which comprises producing a condensation resin from a phenol and formaldehyde as the principal reaction agents and in approximately equimolecular proportions and in the presence of a catalyst that will produce an advancing type resin, arresting the reaction when the condensation from said agents produces a mass having a gel consistency at least approximately as heavy as fresh putty and before it reaches the insoluble and infusible stage, separating the resin from the condensation liquid, dissolving such resin in a solvent containing phenol in an amount greater than 5% of the resin, and blending therewith a separately formed resin which is the gasoline insoluble portion of oxidized abietic acid.

5. An improved varnish composition capable of forming a smooth finish on baking, and comprising a blend of separately formed resins in solution, one of which resins is a thermo-setting resin having a phenol and formaldehyde as the principal reaction agents thereof and in approximately molecular proportions, and with the condensation arrested after a sample of the condensed resin from said agents when cooled to room temperatures has a consistency at least as hard as fresh putty and before it has become infusible and insoluble, the other of which resins is the gasoline insoluble portion of oxidized abietic acid, said solution containing a common phenolic solvent for the resins of the blend in which the phenolic solvent equals at least approximately 5% of the quantity of the thermo-setting resin dissolved therein.

6. The process substantially set forth in claim 5 in which the phenol is cresol.

7. An improved non-thickening paint composition, comprising a blend of separately formed resins one of which is a thermo-setting, phenol-formaldehyde condensation resin, with the condensation arrested before an insoluble resin is obtained, and then dissolved in a solution containing cresol in an amount equaling at least approximately 10% of such resin, the other of which resins is selected from the group consisting of polybasic acid-polyhydric alcohol esters, natural gum resins, and the gasoline insoluble portion of oxidized abietic acid, and a quantity of white lead pigment mixed with said blend.

8. An improved non-thickening paint composition, comprising a thermo-setting phenol-formaldehyde condensation resin with the condensation arrested before an insoluble resin is obtained and then dissolved in a solution containing cresol in an amount equaling at least approximately 10% of such resin and having mixed therewith a white lead pigment.

9. An improved varnish composition capable of forming a smooth finish on baking and comprising a solution having dissolved therein a separately formed thermo-setting, phenol-formaldehyde resin which has been condensed with the phenol and aldehyde as the principal reaction agents in approximately molecular proportions and with the condensation of said agents arrested after the resin reaches approximately the consistency of fresh putty and before it reaches the hard, infusible and insoluble stage, the other of said resins being selected from the group consisting of polybasic acid-polyhydric alcohol esters, natural gum resins and the gasoline insoluble portion of oxidized abietic acid, said solution containing phenol, with the phenol of the solvent present in a quantity equalizing more than approximately 5% of the quantity of thermo-setting resin in the solution.

10. A process of preparing a coating composition or the like capable of forming a smooth finish on baking which consists essentially of producing a thermo-setting resin from a phenol and formaldehyde as the principal reaction agents and in approximately molecular proportions, blending said resin before it reaches the infusible and insoluble stage with a resin selected from the group consisting of polybasic acid-polyhydric alcohol esters, natural gum resins, and the gasoline-insoluble portion of oxidized abietic acid, and in a common solvent for both of said resins, said common solvent containing a phenol equaling at least approximately 10 percent of the quantity of thermo-setting resin used.

11. An improved composition capable of forming a smooth finish on baking and consisting essentially of a blend of separately formed resins in solution, one of which resins is a thermo-setting resin formed of a phenol and formaldehyde as the principal reaction agents, the phenol and formaldehyde being used in approximately molecular proportions, and with the reaction arrested before an insoluble and infusible resin is obtained, the other of which resins is selected from the group consisting of polybasic acid polyhydric alcohol esters, natural gum resins, and the gasoline-insoluble portion of oxidized abietic acid, said solution containing a common solvent for both resins in which is incorporated a phenol in a quantity equaling at least approximately 10 percent of the quantity of the thermo-setting resin in the blend.

JOHN FLETCHER.